INVENTOR.
Kurt Toensfeldt

Dec. 30, 1952 K. TOENSFELDT 2,623,980
ELECTRIC STEAM GENERATOR AND CONTROL MEANS THEREFOR
Filed Nov. 28, 1947 2 SHEETS—SHEET 2
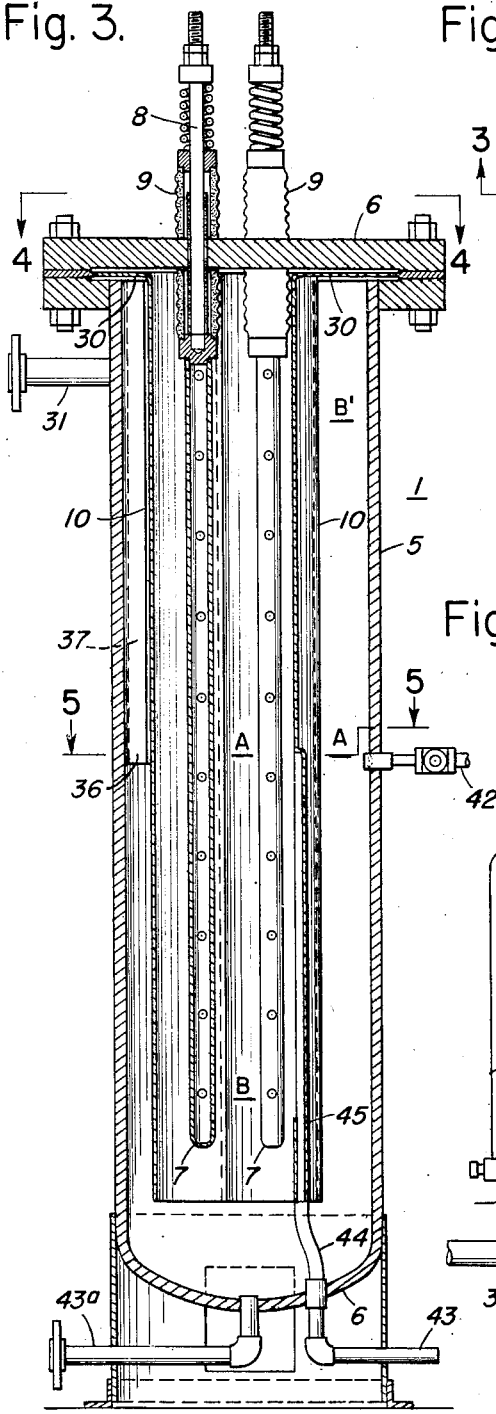
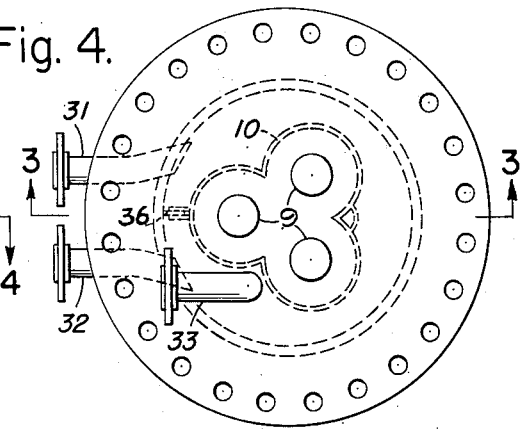
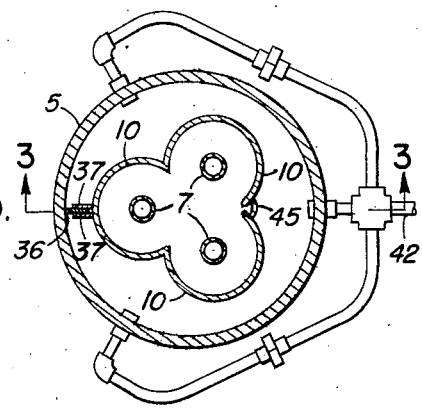
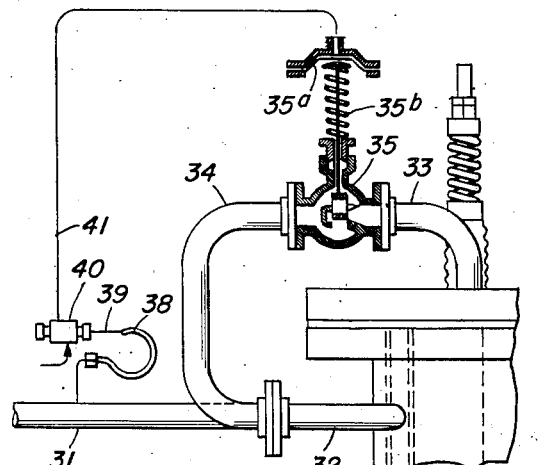
INVENTOR.
Kurt Toensfeldt
BY
R. F. Bryant
Attorney Patented Dec. 30, 1952

2,623,980

UNITED STATES PATENT OFFICE 2,623,980

ELECTRIC STEAM GENERATOR AND CONTROL MEANS THEREFOR

Kurt Toensfeldt, Port Washington, N. Y., assignor to Combustion Engineering-Superheater, Inc., a corporation of Delaware Application November 28, 1947, Serial No. 788,356

5 Claims. (Cl. 219—40)

This invention relates to electric steam generators of the liquid-immersed electrode type and improved means for causing such generators automatically to respond to variable loads.

In electric boilers the current flows through the water between electrodes submerged therein and generates heat which is converted to steam by evaporating the water. For a constant voltage, the rate at which heat is generated will depend upon the flow of electric current through the water. At the same water temperature the current flow varies directly with the conductivity of the water and this varies with the concentration of salts in solution. With a substantially constant concentration of salts maintained in the boiler water and a constant water temperature, the current flow will depend upon the depth of the immersion of the electrodes.

The water in the generator contains both the heat equivalent to the steam pressure and the desirable concentration of salts. To avoid wasting this water when it is withdrawn from the generator so as to reduce the immersion of the electrodes, it has in the past been proposed to provide an external surge or storage tank in which the excess water is temporarily stored.

An object of this invention is to provide improved control means for varying the immersion of the electrodes in an electric steam generator in response to a pressure variation resulting from the quantity of steam demanded from the generator.

Another object is to replace the external surge or storage tank earlier mentioned by improved storage means uniquely disposed within the generator's main tank or drum in a way affording advantages heretofore unattainable.

Additional objects of the invention will appear from the following description of illustrative embodiments thereof when read in conjunction with the accompanying drawings wherein:

Figure 3 is a cross section in elevation (on line 3—3 of Figure 4) of an electric steam generator constructed in accordance with my invention to have the surge-water storage space uniquely disposed within the generator's main tank or drum in a way affording advantages heretofore unattainable;

Figure 4 is a plan view taken on line 4—4 of Figure 3 and showing certain details of the steam piping;

Figure 5 is a sectional view taken on line 5—5 of Figure 3 and showing the feedwater piping; and Figure 6 is a fragmentary outside elevation of the top portion of Figure 3 showing the throttle valve plus further details of the steam piping.

Figures 1, 2:
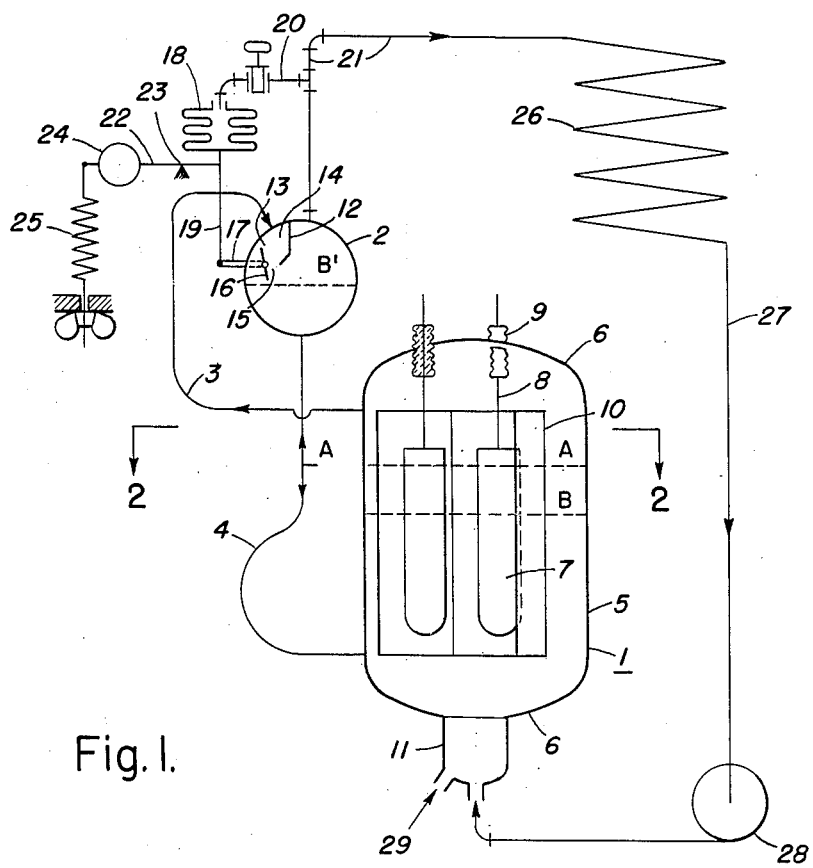
Figure 1 is a diagrammatic view in elevation (on line 1—1 of Fig. 2) of an electric steam generator equipped with an external surge tank and provided with the electrode-immersion control means of my invention.
Figure 2 is a cross section through the generator proper taken on line 2—2 of Figure 1.

Referring first to Figures 1 and 2, an electric steam generator there shown at 1 is connected to an external steam and water drum 2 by steam and water circulators 3 and 4 respectively. Drum 2 may be mounted above the generator 1 as shown with its longitudinal axis transverse to the axis of the generator 1.

This generator 1 comprises a cylindrical shell 5 having dished heads 6 fastened thereto forming a pressure vessel. Suspended within the generator 1 are electrodes 7, in this case three in number, the electrodes being suspended by conductor members 8 which pass through insulators 9 in the upper drum head 6 and the conductors 8 are connected at their upper ends to a source of electric power (not shown).

Surrounding the electrodes 7 are neutral plates 10 concentrically and equally spaced from the electrodes and forming a clover leaf structure 10 in cross section as shown in Figure 2. The clover leaf formed by neutral plates 10 is open top and bottom so that the water within the generator will be at the same level within the clover leaf and between the clover leaf and the shell. A sediment chamber 11 may be provided at the bottom of the generator.

Within the upper portion of the steam drum 2 is a partition 12 forming steam chamber 13 extending longitudinally of the drum a distance sufficient to include all of the steam circulators 3. Steam chamber 13 is sealed by end plates 14 to the drum and forms a closed chamber excepting for one or more openings 15 communicating with the steam space of the drum, within which openings is mounted a balanced damper or dampers 16 on a common shaft. The damper 16 serves as a throttle to vary the resistance to the flow of steam between the chamber 13 and the steam space of the drum 2. The shaft of damper 16 may extend through the end of the drum and be connected to a lever 17.

A diaphragm motor 18 is connected by rod 19 to the end of lever 17 and causes the lever, and with it the throttle damper or dampers 16, to rotate so as to open or close the opening or openings 15. The diaphragm motor 18 is connected by valved pipe 20 to the steam offtake 21 from drum 2. A lever 22 hinged to rod 19 is fulcrumed at 23 and is provided at its outer end with a weight 24 and a spring 25 both of which oppose the downward movement of the diaphragm motor 18. Steam from drum 2 passes via pipes 21 to consumer apparatus 26 and the condensate returns may be carried via pipe 27 to a circulating pump 28 to the steam generator 1. Make up water may be added through connection 29.

The steam vaporized in the generator 1 passes through steam circulators 3 to discharge into the chamber 13 within drum 2. From the chamber 13 the steam and water mixture from the generator must pass through the opening 15 containing throttling damper 16 and thence into the steam space of drum 2. Water separated out of the steam in drum 2 is returned via water circulators 4 back into the lower portion of the generator 1.

In operation the generator 1 is filled with water to the level A and due to lack of pressure the diaphragm motor 18 is deflated and holds the throttling damper 16 in wide open position. Upon delivering electric current to the generator, steam will be generated and when full flow of steam passes through the steam circulators 3 the water level within the generator 1 will drop slightly below A and rise in the water circulators 4. This occurs because the resistance of the steam circulators to steam flow depresses the water in the generator. The balanced throttle damper 16 is now wide open and offers substantially no additional resistance to the steam flow.

With full load steam demand, the electrodes are fully immersed to approximately level A. As the steam demand by the consumer 26 decreases the fully immersed electrodes generate too much steam and the pressure in the steam offtake 21 rises. Diaphragm motor 18 which responds to this pressure rise inflates against the tension of spring 25, partly closes damper 16 and the added resistance of the damper to steam flow into drum 2 raises the pressure in the steam space in the generator 1 and depresses the water level in the generator to a level below A. The continued rise in steam pressure in offtake 21 and subsequent throttling by damper 16 continues to depress the water level in the generator 1 until the portion of the electrodes remaining immersed just generate sufficient steam to maintain the slightly increased pressure in offtake 21 and a balance is established.

The depressed water level causes a portion of the water from the generator to flow upwardly through the water circulators 4 into the steam drum 2. The head representing the differences in water levels in the steam drum and generator is a measure of the resistance of the steam circulators 3 and that added by the throttling damper 16. With minimum load the maximum depression of the water in the generator is shown as level B and the corresponding level in the steam drum is at about level B'. This maximum depression of the water levels from A to B is limited by the capacity of the drum 2 to receive the water from the generator 1. Obviously if a greater depression of the water within the generator were desired, a larger drum 2 would be provided.

As the load again increases the operation is in reverse. With increased steam demand the pressure in the steam offtake 21 falls, the motor diaphragm 18 deflates and opens the throttling damper 16, the resistance in the steam circuit 3 between generator 1 and drum 2 falls, the water level in the generator rises, the greater immersion of the electrodes generates more steam, until a balance again occurs where the electrodes just generate sufficient steam to maintain the slightly decreased pressure in offtake 21.

The design of the throttling damper or valve 16 and the spring 25 is not critical. As the steam pressure rises the valve 16 closes until it establishes the pressure difference between generator 1 and steam drum 2 necessary to depress the water level within the generator for proper electrode immersion. The rise in steam pressure necessary to move the valve is dependent upon the resistance of spring 25; a stiffer spring causing a slightly higher pressure rise to close the throttling valve by the same amount and a lighter spring causing a relatively lower pressure rise. The operating steam pressure is balanced by weight 24 which exerts a constant pressure on diaphragm motor 18.

Placing the steam drum 2 well above the generator has the advantage of providing an ample head between the water levels in the steam drum 2 and in the generator 1 for the higher ratings when the water carryover with the steam through the steam circulators 3 may increase the resistance therethrough.

By passing all of the steam leaving the generator through the drum 2, both the steam and water carried over therewith tend to keep the storage water within the drum at the same temperature as the generator water. At high loads the water level in the steam drum 2 falls and provides more steam separating space.

The water stored in drum 2 includes both the water within the clover leaf 10 surrounding the electrodes and the water between the clover leaf 10 and the shell 5 of the generator 1. The latter water unnecessarily adds to the volume of water to be stored in drum 2 because the load regulation only requires a variation of water within the clover leaf 10.

The embodiment of the invention according to Figures 3, 4, 5 and 6, overcomes this disadvantage by using the space surrounding the clover leaf as a storage chamber for the water being displaced from the space within the clover leaf.

Referring to Figures 3 through 6, the generator 1 thereof (as in Figures 1 and 2) comprises a cylindrical shell 5 having heads 6 fastened thereto forming a pressure vessel. Disposed within the generator 1 are electrodes 7, in this case three in number, the electrodes being suspended by conductor members 8 which pass through insulators 9 in the upper drum head 6 and the conductors are connected at their upper ends to a source of electric power (not shown). Surrounding the electrodes are neutral plates 10 concentrically and equally spaced from the electrodes and forming a clover leaf structure 10 in cross section as shown in Figures 4 and 5. The clover leaf formed by neutral plates 10 is open at the bottom and forms a seal at the top with the plate 30 which closes off the top of the space between the neutral plates 10 and the generator shell 5.

The generator interior, as shown in Figure 5, is thereby divided into two chambers, one within and the other outside of the clover leaf. The chambers communicate at the bottom (see Figure 3) so that water may pass from one chamber to the other around the bottom of the clover leaf.

A steam offtake 31 and a steam connection 32 (see Figure 4) are connected to the top of the outer chamber. A steam offtake 33 (see Figures 4 and 6) is connected into the top of the chamber within the clover leaf and a pipe 34 (see Figure 6) connects offtake 33 with steam connection 32. Within pipe 34 is a diaphragm-motor-operated throttle valve 35 that closes or opens in response to the rise and fall respectively of the steam pressure in pipe 31.

Between steam offtake 31 and steam connection 32 the steam space of the chamber around the clover leaf is preferably divided by a partition 36 (see Figures 3 and 5) extending from top plate 30 down into the water. As shown in Figure 5 partition 36 may be fastened to the shell 5 and extend in sliding contact between two equally long plates 37 fastened to the clover leaf 10 thereby forming a yielding seal to accommodate differences in expansion movements between the clover leaf and the shell. Steam leaving through offtake 33 passes through pipe 34 into connection 32 on one side of partition 36, and is thence obliged by the presence of partition 36 to pass around the clover leaf to the other side thereof to leave the generator through offtake 31.

The means for controlling throttle valve 35 in response to steam pressure may be by Bourdon gauge 38 (see Figure 6) connected into offtake 31 and acting on the stem 39 of an air control valve 40. Air under pressure enters valve 40 as shown by the arrow and is impressed via tube 41 on the diaphragm 35a of throttle valve 35 at a pressure determined by the steam pressure leaving the generator.

Feed water is supplied into the chamber surrounding the clover leaf 10 by connection 42 at a location well above the bottom of the clover leaf. The feed water traveling downwardly through said chamber becomes heated to steam temperature before entering the chamber within the clover leaf in which steam generation takes place. A bleeder connection 43 is provided from the bottom of the generator through which water is withdrawn to maintain a desired concentration of salts or conductivity within the generator. Preferably the bleeder connection 43 may be extended through pipe 44 to connect into a conduit 45 on the outside of the clover leaf adjacent the meeting edges of the neutral plates 10. The neutral plates may be spaced apart adjacent conduit 45 or may be perforated to permit flow of water from within the clover leaf into the conduit. The conduit 45 preferably extends up to the highest water level within the clover leaf so as to drain water of highest concentration from the generator.

In operation of the apparatus shown by Figures 3 through 6, the generator 1 is filled with water to the level A and due to lack of pressure the diaphragm motor 35a holds the throttle valve 35 in wide open position. Upon delivering electric current to the generator steam will be generated and when full flow of steam passes through the offtake pipe 31 the water level within the clover leaf will be about at the level of the water surrounding the clover leaf. The throttle valve 35 is now wide open and offers substantially no resistance to the steam flow.

With full load steam demand the electrodes are fully immersed to approximately level A and the valve 35 is wide open. As the steam demand decreases the fully immersed electrodes generate too much steam and the pressure in the steam offtake 31 rises. The diaphragm of valve 35 responds to this pressure and the diaphragm 35a inflates against the compression of spring 35b, partly closes valve 35 and the resistance of the valve to steam flow into the outer chamber surrounding the clover leaf depresses the water level within the clover leaf to a level below A. This rise in pressure and subsequent throttling by valve 35 continues to depress the water within the clover leaf until the portion of the electrodes remaining immersed just generate sufficient steam to maintain the increased pressure and a balance is established.

The depressed water level within the clover leaf 10 is delivered to the storage space around the clover leaf and causes a rise in the water level there. The head representing the difference in water levels around and within the clover leaf is a measure of the resistance of the throttle valve 35. With minimum load the maximum depression of the water within the clover leaf is shown at level B and the corresponding level around the clover leaf is at level B'.

As the load again increases the operation described above is in reverse. With increased steam demand the pressure in the steam offtake 31 falls, the diaphragm 35a of valve 35 deflates and opens the throttle valve 35 the resistance through the valve falls and the water level within the clover leaf rises, while the water level surrounding the clover leaf falls. The greater immersion of the electrodes generates more steam until a balance again occurs where the electrodes generate just sufficient steam to mention the slightly decreased pressure.

Preferably the steam generator of Figures 3 to 6 is constructed of relatively small diameter compared to its height. Such construction affords a greater variation in water level with change in load both within and around the clover leaf and provides a greater sensitiveness in the control apparatus. Furthermore, in large generators it minimizes the plate thicknesses and sizes for constructing the shell. Preferably the horizontal cross sectional area of the water within the storage space around the clover leaf may be made greater than the horizontal cross sectional area of the water within the clover leaf. These proportions assure an advantageous larger vertical movement in the electrode water level (inside the clover leaf 10) compared with the movement in the storage water level (outside the clover leaf 10).

Although I prefer to control throttle device 16 or 35 by means responsive to the offtake pressure, I have found that it may also be controlled by means responsive to the pressure within the steam generator chamber containing the electrodes.

In order to fully utilize the storage space of this, Figures 3 to 6, generator effectively at all ratings and particularly at maximum rating, it is necessary to maintain a substantially constant volume of water within the generator. To accomplish this, means must be provided to feed water into the generator (via inlet 42) in amount equal to the steam offtake plus bleed. Furthermore the conductivity of the water within the generator should preferably be maintained substantially constant so that steam generated will be proportional to electrode immersion and that maximum output may be realized with maximum electrode immersion.

With the conductivity maintained substantially constant, and constant steam pressure and a constant water volume, the water level around the clover leaf will rise proportionately to the fall in water level within the clover leaf or to the electrode immersion, or to the steam output. Under these conditions, either the water level around the electrodes or that around the clover leaf will provide a direct measure of the feed water required by the generator.

In my copending application Serial No. 793,485 entitled "Control Means for Electric Steam Generators" and filed December 23, 1947, now Patent No. 2,535,569, issued December 26, 1950, I have disclosed satisfactory means for controlling both the admission of feed water to and the conductivity of the water within a steam generator such as shown by Figures 3 to 6. As such control means supplement the improvements to which the present application is directed, no attempt to repeat a disclosure thereof will here be made.

In now considering the operation of the new steam generator of Figures 3 to 6 it may instead be assumed that offtake pipe 31 leads to steam consumer apparatus such as is shown at 26 in Figure 1; that feedwater inlet 42 is connected with the discharge of circulating pump 28 in the Figure 1 system; that upon initial generator start up, or after a period of operation, water of proper concentration and quantity for satisfactory operation of such a fully-closed system containing the generator of Figures 3 to 6 is established; that bleeder and blow down connections 43 and 43a are kept closed; and that the improved steam generator of Figures 3 to 6 thereupon operates in the automatic manner earlier described to supply consumer apparatus 26 with its varying requirements for steam. Under these assumed closed-system conditions feed water and conductivity controls are not essential to stable generator operation; but when the generator of Figures 3 to 6 is used with them in a partly or wholly open-circuit system all advantageous features of generator operation are again realized.

While preferred embodiments of my invention have been shown and described, it will be understood that the use of equivalents may be employed and changes in construction, combination and arrangement of parts may be made without departing from the spirit and scope of the invention as claimed.

What I claim is:

1. In an electric steam generator, the combination of a vaporizing chamber, a water-heating electrode within said chamber immersed to a depth dependent upon the chamber water level whereby the rate of steam generation increases as that level is raised and decreases as that level is lowered, a storage chamber external to said vaporizing chamber and having space for water in the lower portion thereof and space for steam in the upper portion thereof, conduit means connecting the lower portion of said storage chamber with the lower portion of said vaporizing chamber to permit transfer of water from one chamber to the other in response to pressure differences, a steam connection between the upper portions of said vaporizing and storage chambers and a main steam offtake from the storage chamber's steam space whereby generated steam flows from the vaporizing chamber through said connection and thence through said storage chamber to said main offtake, a throttling valve in said steam connection to introduce an adjustable resistance to the flow of steam therethrough and thereby control the relative water levels in said vaporizing and storage chambers, and control means responsive to the steam pressure in one of said two chambers for adjusting said throttling valve in a way which automatically keeps said water-heating electrode immersed to and only to the extent needed to generate steam at a rate which matches the steam discharge through said main offtake.

2. In an electric steam generator comprising an upright pressure drum and an electrode extending vertically downwardly thereinto for immersion in drum-contained water to be vaporized, the combination of vertical partition means closedly surrounding said electrode in spaced relation to the drum's outer shell and forming an inner vaporizing chamber and a separate outer chamber for storage of water between the partition means and said outer shell, water-connection means at the bottom of said two chambers for permitting transfer of water from one chamber to the other, a steam connection from the upper portion of said vaporizing chamber to the upper portion of said storage chamber, a throttling valve in said steam connection to introduce an adjustable resistance to steam flow out of the vaporizing chamber, a steam offtake from said storage chamber's upper steam space, and feed water supply means communicating with the interior of said outer storage chamber at an intermediate elevation therein whereby incoming water has to pass downwardly outside of said partition means and thence into said inner vaporizing chamber at the bottom thereof.

3. In an electric steam generator comprising an upright pressure drum and three electrodes extending vertically downwardly thereinto for immersion in drum-contained water to be vaporized, the combination of a clover-leaf neutral plate structure closely surrounding said electrodes in spaced relation to the drum's outer shell and forming an inner vaporizing chamber that includes the electrodes and a separate outer chamber for storage of water between the plate structure and said outer shell, a water connection between the lower portions of said two chambers, a steam connection between the upper portions of said two chambers plus a steam offtake from the storage chamber's upper steam space, a throttling valve in said steam connection to introduce an adjustable resistance to steam flow out of the vaporizing chamber, feed water supply means communicating with the interior of said outer storage chamber at an intermediate elevation therein, and a water bleed connection communicating with the interior of said clover leaf plate structure and organized to draw bleed water from a selected portion of that plate structure interior.

4. In an electric steam generator, a vaporizing chamber, an electrode extending downwardly thereinto for immersion in chamber-contained water to be vaporized, a storage chamber in water-interchange communication with said vaporizing chamber, a steam connection leading from the upper portion of said vaporizing chamber into the upper portion of said storage chamber, a main offtake for the generator steam leading out of the storage chamber's said upper portion and being separate from the aforesaid steam connection whereby all steam entering said offtake must first pass from the steam connection's storage chamber end into and through the storage chamber interior, a throttling valve in said steam connection intermediate the vaporizing and storage chambers, and control means for said valve responsive to the steam pressure in said main offtake and effective to vary the valve-introduced resistance to steam flow out of the vaporizing chamber in accordance with said pressure whereby to govern the vaporizing chamber water level and electrode immersion in a way which automatically keeps the rate of steam generation in the vaporizing chamber matched with the rate at which steam leaves the generator by way of said main offtake.

5. In an electric steam generator, walls forming a vertically extending vaporizing chamber, an electrode extending downwardly thereinto for immersion in water in said chamber, walls forming a vertical cylindrical storage chamber which concentrically surrounds said vaporizing chamber in water interchange communication therewith and which extends at least for the vaporizing chamber's full height, a steam connection between the upper portion of said vaporizing chamber and the upper portion of said storage chamber, a main steam offtake leading out of said upper portion of the storage chamber and being separate from the aforesaid steam connection whereby all steam entering said offtake must first pass from the steam connection's storage chamber end into and through the storage chamber interior, partition means within the upper portion of said storage chamber interior extending across the space between storage and vaporizing chamber walls and downwardly from the storage chamber top between the steam connection and main offtake openings through the storage chamber wall to below the lowermost level of water within the storage chamber whereby steam entering the storage chamber via said steam connection is required to pass through a substantial circumferential steam space portion of the chamber interior before leaving that interior via said main offtake, a throttling valve in said steam connection intermediate the vaporizing and storage chambers, and control means for said valve responsive to the steam pressure in said main steam offtake and effective to vary the valve-introduced resistance to steam flow out of the vaporizing chamber in accordance with said pressure whereby to govern the vaporizing chamber water level and electrode immersion in a way which automatically keeps the rate of steam generation in the vaporizing chamber matched with the rate at which steam leaves the generator by way of said main offtake.

KURT TOENSFELDT.

REFERENCES CITED

The following references are of record in the file of this patent:

UNITED STATES PATENTS

| Number | Name | Date |
|---|---|---|
| 1,504,928 | Bergeon | Aug. 12, 1924 |
| 1,665,793 | Sandborgh | Apr. 10, 1928 |
| 2,180,445 | Vickery | Nov. 21, 1939 |
| 2,185,786 | Eaton | Jan. 2, 1940 |
| 2,421,311 | Binnington | May 27, 1947 |
| 2,453,210 | Eaton | Nov. 9, 1948 |
| 2,453,211 | Eaton | Nov. 9, 1948 |
| 2,454,174 | Hill et al. | Nov. 16, 1948 |
| 2,485,762 | Mittendorf | Oct. 25, 1949 |
| 2,485,999 | Birchler et al. | Oct. 25, 1949 |